US011150956B2

(12) United States Patent
Bonagiri et al.

(10) Patent No.: US 11,150,956 B2
(45) Date of Patent: Oct. 19, 2021

(54) RESOLVING CONTAINER PREEMPTION

(71) Applicant: International Business Machines Corporation, Armonk, NY (US)

(72) Inventors: Krishna Kishore Bonagiri, Ambajipet (IN); Eric A. Jacobson, Arlington, MA (US); Ritesh Kumar Gupta, Hyderabad (IN); Scott Louis Brokaw, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 16/417,678

(22) Filed: May 21, 2019

(65) Prior Publication Data
US 2020/0371839 A1    Nov. 26, 2020

(51) Int. Cl.
*G06F 9/46* (2006.01)
*G06F 9/50* (2006.01)
*G06F 9/48* (2006.01)

(52) U.S. Cl.
CPC ............ *G06F 9/505* (2013.01); *G06F 9/461* (2013.01); *G06F 9/4887* (2013.01)

(58) Field of Classification Search
CPC ......... G06F 9/505; G06F 9/461; G06F 9/4887
USPC ....................................................... 718/105
See application file for complete search history.

(56) References Cited

U.S. PATENT DOCUMENTS 9,787,761 B2    10/2017  Bonagiri
9,800,517 B1 *  10/2017  Anderson ............... H04L 47/70
10,564,998 B1 *  2/2020  Gritter ................. G06F 9/45558
10,956,196 B1 *  3/2021  Gritter ................. G06F 9/45558
2014/0281704 A1  9/2014  Jacobson
2015/0040133 A1  2/2015  Caufield
2015/0269006 A1 *  9/2015  Caufield ............. G06F 11/3419
                                                                 718/105

(Continued)

FOREIGN PATENT DOCUMENTS

GN    109446395 A    3/2019

OTHER PUBLICATIONS

Chapman et al., "Predictive Resource Scheduling in Computational Grids", 1-4244-0910-1/07 © 2007 IEEE, 10 pages.

(Continued)

*Primary Examiner* — Bradley A Teets
(74) *Attorney, Agent, or Firm* — Brian M. Restauro

(57) ABSTRACT

A set of resources required to process a data integration job is determined. In response to determining that the set of resources is not available, queue occupation, for each queue in the computing environment, is predicted. Queue occupation is a workload of queue resources for a future time based on a previous workload. A best queue is selected based on the predicted queue occupation. The best queue is the queue or queues in the computing environment available to be assigned to process the data integration job without preemption. The data integration job is processed using the best queue. It is determined whether a preemption event occurred causing the removal of resources from the best queue. A checkpoint is created in response to determining that a preemption event occurred. The checkpoint indicates the last successful operation completed and provides a point where processing can resume when resources become available.

20 Claims, 3 Drawing Sheets

(56) References Cited

U.S. PATENT DOCUMENTS

2016/0127382 A1    5/2016  Li

OTHER PUBLICATIONS

Liang et al., "Adaptive Multi-Resource Prediction in Distributed Resource Sharing Environment", 2004 IEEE International Symposium on Cluster Computing and the Grid, 0-7803-8430-X/04 © 2004 IEEE, 8 pages.

Naseera et al., "Host CPU Load Prediction Using Statistical Algorithms : A Comparative Study", IJCTA, 9(12), 2016, © International Science Press, 7 pages.

* cited by examiner

RESOLVING CONTAINER PREEMPTION

BACKGROUND

The present invention relates generally to the field of data integration, and more particularly to resolving preemption of resources when running data integration jobs.

A data integration (DI) job extracts data from multiple sources, transforms the data, and pushes the data to a target (i.e., completion of processing for the DI job). This is also known as an extract, transform, load (ETL) job. The DI job can be run in a cluster (i.e., a plurality of computing devices) utilizing one or more nodes (i.e., a set of processing and memory resources) that run in parallel. The processing of the DI job is controlled by a Resource Management Tool (RMT) which assigns the computing resources required and determines the amount of time needed to complete the job. Each program or application required to process the DI job would be packaged in a container and any number of containers can be found on a node. When processing of the DI job begins, multiple containers on multiple nodes (within the cluster) run in parallel. A DI job is successfully completed when all the containers complete their work and the result is reported.

SUMMARY OF THE INVENTION

Embodiments of the present invention include an approach for resolving preemption of resources when running data integration jobs. In one embodiment, a set of resources required to process a data integration job is determined. It is determined whether the set of resources is available. In response to determining that the set of resources is not available, queue occupation, for each queue in the computing environment, is predicted. Queue occupation is a workload of queue resources for a future time based on a previous workload. Each queue in the computing environment includes a portion of the total available resources. A best queue is selected based on the predicted queue occupation. The best queue is the queue or queues in the computing environment available to be assigned to process the data integration job without preemption. The data integration job is processed using the best queue. It is determined whether a preemption event occurred causing the removal of resources from the best queue. A checkpoint is created in response to determining that a preemption event occurred. The checkpoint indicates the last successful operation completed and provides a point where processing can resume when resources become available.

DETAILED DESCRIPTION

Embodiments of the present invention allow for resolving preemption during the processing of a data integration (DI) job. Today, when a DI job is processed, resources within a computing cluster are assigned to that job. Multiple jobs can be processed within the cluster at the same time, including the DI job of interest. If one or more of the other jobs being processed have a higher priority to finish than the DI job of interest, allocated resources which were initially assigned to the DI job of interest can be reallocated to another higher priority job running in the computing cluster. This reallocation of resources can negatively impact the processing of the DI job of interest by prematurely terminating the processing of the job before it fully completes processing.

Embodiments of the present invention recognize that there may be a method, computer program product, and computer system for resolving preemption during the processing of a DI job. In an embodiment, when resources committed to, and being used by a specific DI job, are reallocated to a different job (this reallocation is known as preemption), the method, computer program product, and computer system can create a checkpoint and exit the processing of the specific DI job. In an embodiment, after a pre-defined period, a determination can be made whether resources are available to continue processing the specific DI job from the created checkpoint.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
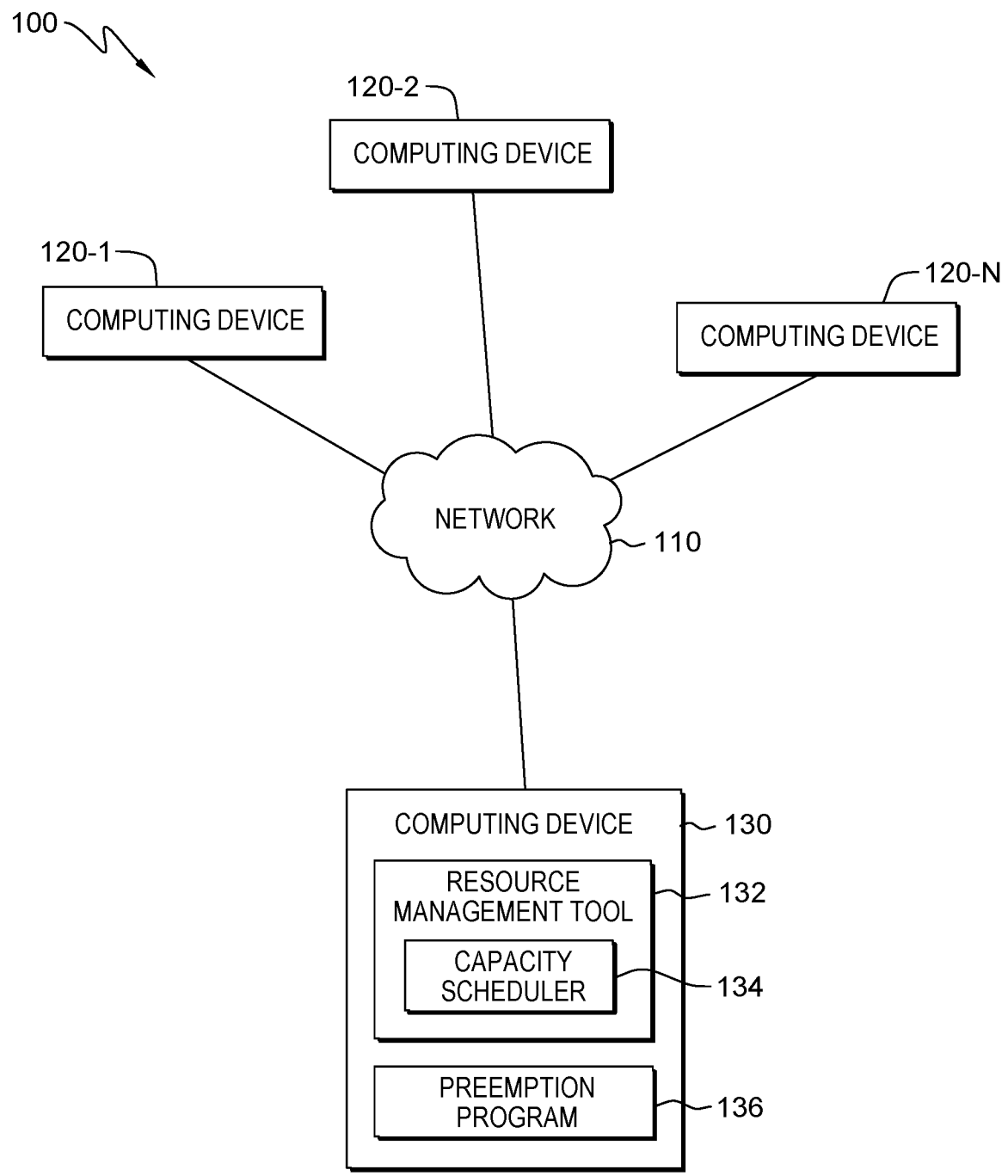
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes a plurality of computing device 120-N and computing device 130 with an overall processing capability shared within computing environment 100, connected to network 110. In this paper, discussion concerning computing device 120-N is applicable for all the plurality of computing device 120-N (i.e., 120-1, 120-2, etc.). In example embodiments, computing environment 100 includes other computing devices (not shown in FIG. 1) such as smartwatches, cell phones, smartphones, wearable technology, phablets, tablet computers, laptop computers, desktop computers, other computer servers or any other computer system known in the art, interconnected with computing device 120-N and computing device 130 over network 110.

In embodiments of the present invention, computing device 120-N and computing device 130 are connected to network 110, which enables computing device 120-N and computing device 130 to access other computing devices and/or data not directly stored on computing device 120-N and computing device 130. Network 110 may be, for example, a short-range, low power wireless connection, a local area network (LAN), a telecommunications network, a wide area network (WAN) such as the Internet, or any combination of the three, and include wired, wireless, or fiber optic connections. In an embodiment, network 110 includes one or more wired and/or wireless networks that are capable of receiving and transmitting data, voice, and/or video signals, including multimedia signals that include voice, data, and video information. In general, network 110 is any combination of connections and protocols that will support communications between computing device 120-N and computing device 130, and any other computing devices connected to network 110, in accordance with embodiments of the present invention. In an embodiment, data received by another computing device (not shown in FIG. 1) in computing environment 100 is communicated to computing device 120-N and computing device 130 via network 110.

In embodiments of the present invention, computing device 120-N may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, computing device 120-N represents a computer system utilizing clustered computers and components (e.g., database server computers, application server computers, etc.) that act as a single pool of seamless resources when accessed by elements of computing environment 100. In general, computing device 120-N is representative of any electronic device or combination of electronic devices capable of executing computer readable program instructions. In an embodiment, computing environment 100 includes any number of computing device 120-N. According to an embodiment of the invention, when combined, the processing capability of each of computing device 120-N provide for an overall processing capability within computing environment 100. Computing device 120-N includes components as depicted and described in further detail with respect to FIG. 3, in accordance with embodiments of the present invention.

In embodiments of the present invention, computing device 130 may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, computing device 130 represents a computer system utilizing clustered computers and components (e.g., database server computers, application server computers, etc.) that act as a single pool of seamless resources when accessed by elements of computing environment 100. In general, computing device 130 is representative of any electronic device or combination of electronic devices capable of executing computer readable program instructions. In an embodiment, computing environment 100 includes any number of computing device 130. Computing device 130 includes components as depicted and described in further detail with respect to FIG. 3, in accordance with embodiments of the present invention.

In an embodiment, computing device 130 includes resource management tool 132, capacity scheduler 134, and preemption program 136.

In an embodiment, resource management tool (RMT) 132 allocates computing resources (i.e., containers) within a cluster of computing devices (such as those depicted in FIG. 1) for processing DI jobs. In an embodiment, RMT 132 runs as a master daemon (i.e., a computer program that runs as a background process, rather than being under the direct control of an interactive user), that arbitrates available containers within a computing cluster among various competing applications. RMT 132 tracks the number of applications being processed and the associated containers being used by those applications. In an embodiment, RMT 132 is the single process capable of allocating containers in a shared, secure, multi-tenant manner within the computing cluster. In an embodiment, RMT 132 includes capacity scheduler 134.

According to embodiments of the present invention, capacity scheduler 134 allows for multiple-tenants to securely share a large computing cluster such that their applications are allocated resources in a timely manner under constraints of allocated capacities. In an embodiment, capacity scheduler 134 can define multiple queues (i.e., a linear structure which follows a specific order in which the operations are performed) with each given a different percentage of the total available resources. Capacity scheduler 134 can allow a given application to use more resources than available on the queue where it is running when other queues have excess capacity available. In an embodiment, capacity scheduler 134 can preempt "borrowed" resources from a first application when a second application running on a queue which owns the borrowed resources requires the borrowed resources to process the application.

According to embodiments of the present invention, preemption program 136 may be a program, a subprogram of a larger program, an application, a plurality of applications, or mobile application software, which functions to resolve preemption of resources when running data integration jobs. A program is a sequence of instructions written by a programmer to perform a specific task. In an embodiment, preemption program 136 runs by itself. In other embodiments, preemption program 136 depends on system software (not shown in FIG. 1) to execute. In one embodiment, preemption program 136 functions as a stand-alone program residing on computing device 130. In another embodiment, preemption program 136 works in conjunction with other programs, applications, etc., found in computing environment 100. In yet another embodiment, preemption program 136 is found on other computing devices (not shown in FIG. 1) in computing environment 100, which are interconnected to computing device 130 via network 110.

In an embodiment, preemption program 136 determines that preemption has occurred within a queue processing a DI job. In an embodiment, preemption program 136 creates a checkpoint and exits the processing. In an embodiment, preemption program 136 determines whether resources are available to start the application from the checkpoint. In an embodiment, when resources are not yet available, preemption program 136 waits a pre-defined period of time. In an embodiment, when resources are available, preemption program 136 determines whether there is sufficient capability within the available resources.

Figure 2:
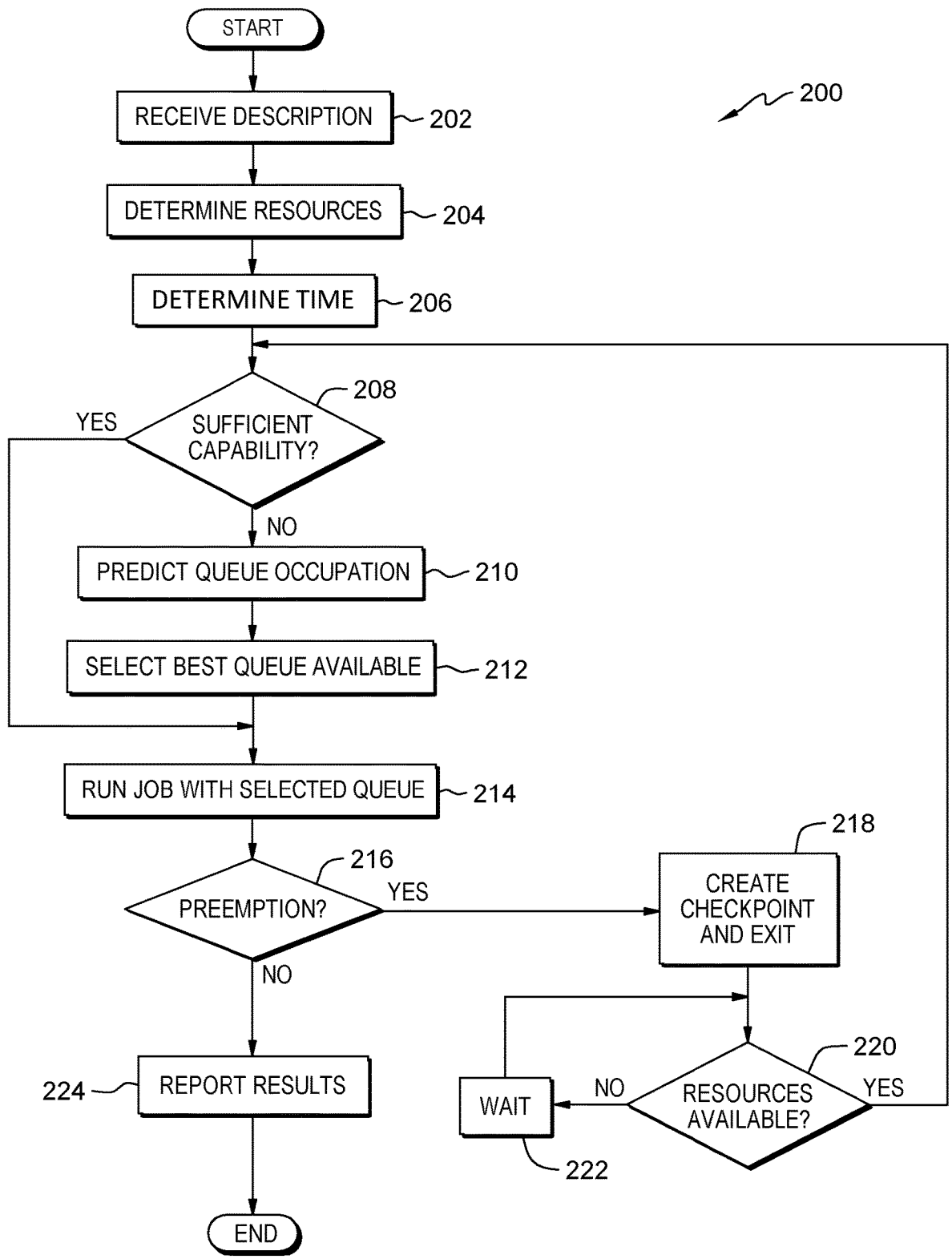
FIG. 2 depicts a flowchart of a program for resolving preemption during the processing of a data integration job, in accordance with an embodiment of the present invention.

FIG. 2 is a flowchart of workflow 200 depicting a method for resolving preemption of resources when running data integration jobs. In one embodiment, the method of workflow 200 is performed by preemption program 136. In an alternative embodiment, the method of workflow 200 is performed by any other program working with preemption program 136. In an embodiment, a user, via a user interface (not shown in FIG. 1), invokes workflow 200 upon sending a request to computing device 130. In an alternative embodiment, a user invokes workflow 200 upon accessing preemption program 136 on computing device 130.

In an embodiment, preemption program 136 receives description (step 202). In other words, preemption program 136 receives the specific details of the data integration (DI) job that needs to be processed within the computing cluster. In an embodiment, the description is a set of specific details concerning the DI job (e.g., how many processes are required to process the job, which computing device should each process run on, what is required of each process, etc.). In an embodiment, preemption program 136 receives the description, input by a user via a user interface (not shown) about a DI job that needs to be processed in an available computing cluster. For example, "Joe" submits a description of data integration job "1" (DI-1).

In an embodiment, preemption program 136 determines resources (step 204). In another embodiment, preemption program 136 identifies resources. In other words, preemption program 136 determines the computing resources within the computing cluster required to process the DI job by querying a resource management tool (RMT) and subsequently receiving the necessary computing resources. In an embodiment, the computing resources are the central processing unit (CPU) requirements. In another embodiment, the computing resources are the memory requirements. In yet another embodiment, the computing resources are both the CPU requirements and the memory requirements. In yet another embodiment, the computing resources are any other computing resources known in the art. In an embodiment, preemption program 136 determines the CPU and memory resources for running the DI job by querying RMT 132 and receiving the CPU and memory resources from RMT 132. For example, a resource management tool determines that both available processors and all of the available memory resources in queue "1" (Q1) are needed to process job DI-1. Furthermore, half of the available memory resources in queue "2" (Q2) are also required to successful process DI-1.

In an embodiment, preemption program 136 determines time (step 206). In other words, preemption program 136 determines the amount of time (i.e., the duration) necessary for the computing resources determined in the previous step to complete processing of the DI job by querying a capacity scheduler and subsequently receiving the time duration needed by the CPU and memory resources needed to process the job. In an embodiment, the amount of time is determined in hours and minutes. In another embodiment, the time duration is determined in any measure of time known in the art. In an embodiment, preemption program 136 interacts with capacity scheduler 134 to determine the amount of time needed to process the DI job. For example, a capacity scheduler determines that the processing of job DI-1 will take thirteen hours and thirty minutes (i.e., 13:30 hours). The result of this determination is that Q1 and half of the memory resources in Q2 will be unavailable for any work except processing DI-1 for 13:30 hours (once processing begins).

In an embodiment, preemption program 136 determines whether sufficient capability exists in the determined resources and determined time to run the DI job (decision step 208). In other words, preemption program 136 determines in a final verification whether the determined resources provide sufficient capability to process the DI job within the determined time period. In an embodiment, preemption program 136 determines whether sufficient capability exists by assessing the entire workload of the computing cluster (i.e., both current workload and anticipated workload) and comparing that workload to the determined resources and time needed to process the DI job. In one embodiment (decision step 208, YES branch), preemption program 136 determines that there is sufficient capability to process the DI job with the determined resources; therefore, preemption program 136 proceeds to step 214 to begin processing the DI job. In the embodiment (decision step 208, NO branch), preemption program 136 determines that sufficient capability does not exist to process the DI job with the determined resources within the determined time period; therefore, preemption program 136 proceeds to step 210 to predict queue occupation.

In an embodiment, preemption program 136 predicts queue occupation (step 210). In other words, preemption program 136 predicts the queue occupation of the plurality of queues within the computing cluster. According to an embodiment of the current invention, the queue occupation is the future workload of the resources within a queue for a future time period based on the previous workload history of said resources. In an embodiment, queue occupation can be predicted by any of the methods known in the art (e.g., models based on the auto-correlation of a single resource or based on the cross correlation between two resources; Kalman filter forecasting; load prediction algorithms such as Homeostatic Prediction, Tendency-based Prediction, and Step Ahead Prediction; and the like). In an embodiment, preemption program 136 predicts the queue occupation of the queues in the cluster. For example, it is predicted that Q1 will be unoccupied (i.e., zero percent occupied), Q2 will be twenty percent occupied, and Q3 will be fifty percent occupied.

In an embodiment, preemption program 136 selects best queue available (step 212). In other words, responsive to predicting the queue occupation, preemption program 136 selects the best available queue to process the DI job to completion. In an embodiment, the best queue to process the DI job is the one or more queues within the computing environment available, based on the predicted queue occupation, to be assigned to a container that includes at least the determined resources required to process the DI job without preemption. In an embodiment, preemption program 136 selects a single queue that can process the DI job. In another embodiment, preemption program 136 selects two or more queues for processing the DI job. In an embodiment, preemption program 136 selects two queues (not shown) in computing environment 100 for processing the DI job. For example, Q1 and half of the memory resources in Q2 are selected to process job DI-1.

In an embodiment, preemption program 136 runs job with selected queue (step 214). In other words, responsive to (i) determining that sufficient capability was available to process the DI job or (ii) selecting the best queue available to process the DI job, preemption program 136 processes the DI job on the selected queue(s). In an embodiment, the selected queue is one queue. In another embodiment, the selected queue is two or more queues. In an embodiment, preemption program 136 processes the DI job on the selected queue(s). For example, job DI-1 is run using one hundred percent of Q1 and fifty percent of the memory resources of Q2.

In an embodiment, preemption program 136 determines whether preemption has occurred (decision step 216). In other words, preemption program 136 determines whether a preemption event of the DI job currently being processed in the selected queue(s) causing removal of resources from said queue(s) has occurred. In an embodiment (decision step 216, NO branch), preemption program 136 determines that a preemption has not occurred during the processing of the DI job; therefore, preemption program 136 proceeds to step 224 to report the result from processing the DI job. In the embodiment (decision step 216, YES branch), preemption program 136 determines that a preemption has occurred during the processing of the DI job; therefore, preemption program 136 proceeds to step 218 to create a checkpoint.

In an embodiment, preemption occurs when excess resources from a first queue, which are given to a second queue to use during the processing of a job, are reallocated back to either the first queue or to another, different queue so that the resources can be used for another purpose. The preemption can occur before the current task being processed is completed which can affect the integrity of the current task. Prior to the actual preemption of the job occurring, the capacity scheduler issues a notification including the parameter "preemption.max_wait_before_termination". The parameter defines the wait time that will pass before the preemption occurs, allowing an action to be taken to mitigate the preemption before the time passes. In an embodiment, capacity scheduler 134 issues a notification including a five minute "preemption.max_wait_before_termination" parameter. In the embodiment, after five minutes passes without any action being taken, RMT 132 reallocates resources currently being used by an application processing a job in a queue on computing device 120-1 back to a queue on computing device 120-2 (the resources are part of this queue on computing device 120-2), prior to computing device 120-1 completing the current task. For example, the capacity manager provides a parameter of ten minutes. After the ten minutes have passed without any action taken, the resource management tool reallocates the fifty percent of the memory resources, which are being used by Q1 but are part of Q2, back to Q2.

In an embodiment, preemption program 136 creates checkpoint and exits (step 218). In other words, responsive to determining that preemption of the processing of the DI job has occurred, preemption program 136 creates a checkpoint and exits processing. In an embodiment, the checkpoint is a marker which indicates the last successful operation completed in the processing of the DI job. The checkpoint provides a point in the processing of the DI job at which the processing can resume when resources become available without negatively impacting the processing. In an embodiment, preemption program 136 creates the checkpoint and exits processing before the time in the parameter "preemption.max_wait_before_termination" provided by capacity scheduler 134 passes. For example, preemption of the processing of job DI-1 has occurred and a six-minute parameter is received which is not enough time to complete the processing; therefore, a checkpoint in the processing of job DI-1 is created and the processing is exited.

In an embodiment, preemption program 136 determines whether there are resources available to process the job (decision step 220). In other words, responsive to exiting the processing of the DI job, preemption program 136 determines whether there are enough resources available to restart the processing of the job. In an embodiment (decision step 220, YES branch), preemption program 136 determines that there are enough resources available to restart the processing of the job; therefore, preemption program 136 returns to step 208. In the embodiment (decision step 220, NO branch), preemption program 136 determines that there are not enough resources available to restart the processing of the job; therefore, preemption program 136 proceeds to step 222 to wait.

In an embodiment, preemption program 136 waits (step 222). In other words, responsive to determining that there are not sufficient resources to restart processing of the DI job, preemption program 136 waits a period of time and then returns to step 220. In an embodiment, the period of time is pre-defined by a user at the time preemption occurs. In another embodiment, the period of time is determined by capacity scheduler 134 based on the queue(s) being managed by RMT 132. In yet another embodiment, the period of time is the time required for all of the processing managed by RMT 132 to complete. In an embodiment, preemption program 136 waits a period of time and then returns to step 220 to determine there are resources available to restart the processing of the job. For example, the processing of job DI-1 is held for thirty minutes and then a determination is made whether there are sufficient resources available to restart the processing of job DI-1.

In an embodiment, preemption program 136 reports results (step 224). In other words, responsive to determining that preemption of the processing of the DI job did not occur, preemption program 136 allows the processing to complete and reports the results. In an embodiment, the processing of the DI job can complete on the selected queue(s). In another embodiment, RMT 132 can reallocate resources from other queues (either queues with excess capacity not in use or idle queues) to the queue(s) processing the DI job to allow the processing to complete in a shorter time than the original time determined by capacity scheduler 134. In an embodiment, an indication of whether preemption occurred is provided, along with the created checkpoint(s) as needed, when the results are reported. In an embodiment, preemption program 136 allows the processing of the DI job to complete and provides an indication that there was not a preemption of the job. For example, processing of job DI-1 was completed via Q1 and resources from Q2 without preemption and the result of the processing is reported.

Figure 3:
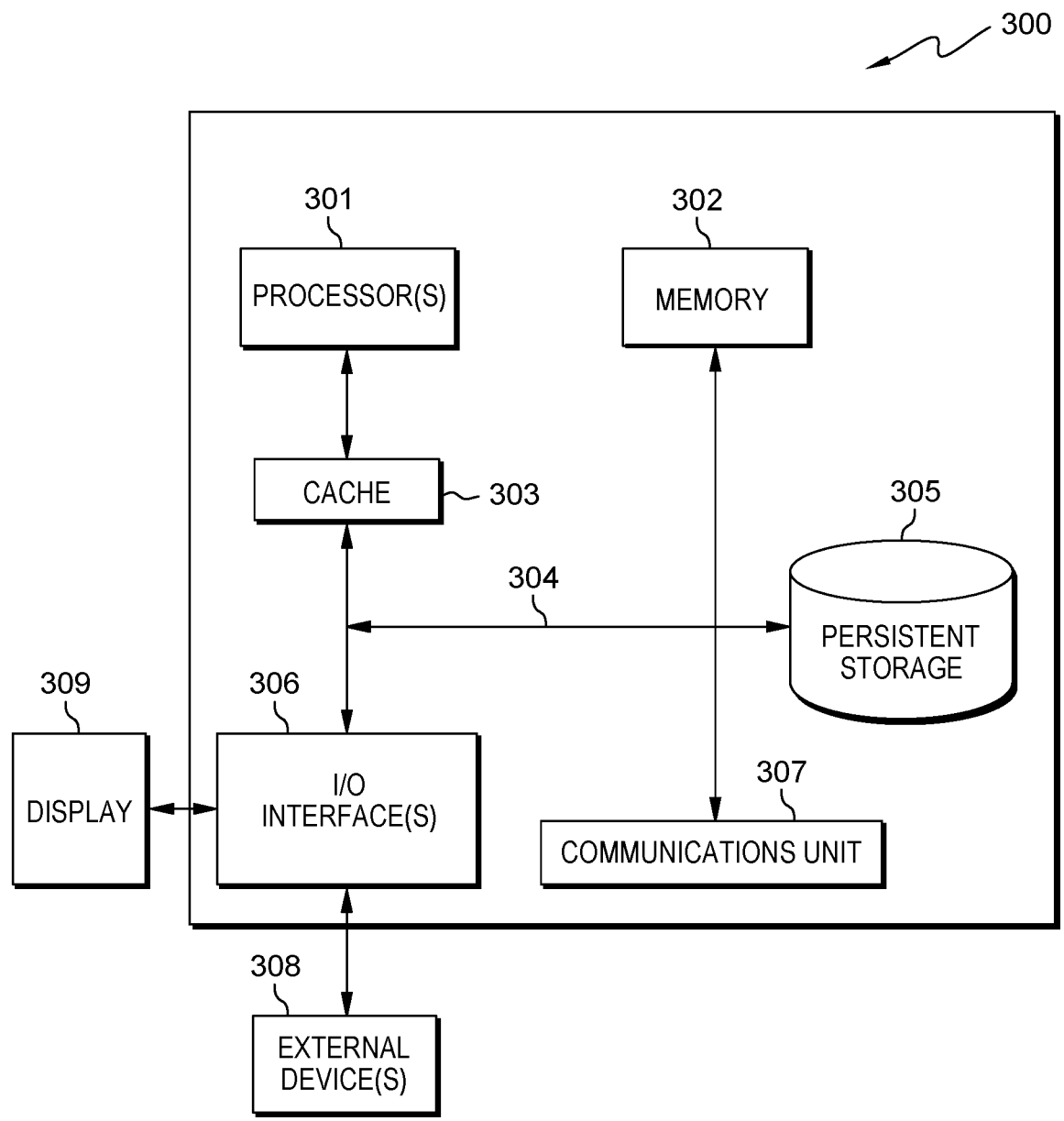
FIG. 3 depicts a block diagram of components of the computing environment of FIG. 1, in accordance with an embodiment of the present invention.

FIG. 3 depicts computer system 300, which is an example of a system that includes preemption program 136. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface (s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
    determining, by one or more computer processors, a set of resources within a computing environment required to process a data integration job to completion;
    determining, by one or more computer processors, whether the set of resources are available to process the data integration job to completion;
    responsive to determining that the set of resources are not available, predicting, by one or more computer processors, a queue occupation for each queue of one or more queues in the computing environment, wherein;
        the queue occupation is a workload of resources within each queue of the one or more queues for a future time period based on a previous workload history of said resources, and
        each queue of the one or more queues in the computing environment include a portion of total resources within the computing environment;
    selecting, by one or more computer processors, a best queue of the one or more queues to process the data integration job based on the predicted queue occupation, wherein the best queue is the one or more queues within the computing environment available, based on the predicted queue occupation, to be assigned to one or more containers that include at least the determined set of resources required to process the data integration job without a preemption event occurring;
    processing, by one or more computer processors, the data integration job using the selected best queue;
    determining, by one or more computer processors, whether the preemption event causing removal of resources from the best queue processing the data integration job has occurred, wherein removal of the resources preempts processing of the data integration job; and
    responsive to determining that the preemption event did occur, creating, by one or more computer processors, a checkpoint, wherein;
        the checkpoint indicates a last successful operation completed while processing the data integration job, and
        the checkpoint provides a point where processing of the data integration job can resume when enough resources become available.

2. The method of claim 1, further comprising:
    responsive to creating the checkpoint, exiting, by one or more computer processors, the processing of the data integration job;
    determining, by one or more computer processors, for a first time whether resources are available to continue processing the data integration job, wherein the determination is made after a first period of time; and
    responsive to determining for the first time that resources are available to continue processing the data integration job, processing, by one or more computer processors, the data integration job starting at the created checkpoint.

3. The method of claim 2, further comprising:
    responsive to determining for the first time that resources are not available to continue processing the data integration job, determining, by one or more computer processors, for a second time whether resources are available to continue processing the data integration job, wherein the determination is made after a second period of time.

4. The method of claim 1, further comprising:
    responsive to determining that the preemption event has not occurred, completing, by one or more computer processors, the processing of the data integration job, and
    reporting, by one or more computer processors, a result of the processing of the data integration job.

5. The method of claim 1, wherein the computing environment includes a plurality of containers assigned to the one or more queues in the computing environment and each container in the plurality of containers is assigned and utilizes a portion of an overall processing capability of the computing environment and a portion of an overall memory capability of the computing environment.

6. The method of claim 1, wherein the preemption event occurs when computing resources assigned to a first queue, in use by a second queue, are required by the first queue for other processing and are subsequently removed from the second queue preempting processing in the second queue.

7. The method of claim 1, wherein the set of resources includes a time duration required to process the data integration job to completion.

8. A computer program product, the computer program product comprising:
    one or more computer readable storage media, and
    program instructions stored on the one or more computer readable storage media, the program instructions comprising:
        program instructions to determine a set of resources within a computing environment required to process a data integration job to completion;

program instructions to determine whether the set of resources are available to process the data integration job to completion;

responsive to determining that the set of resources are not available, program instructions to predict a queue occupation for each queue of one or more queues in the computing environment, wherein;

the queue occupation is a workload of resources within each queue of the one or more queues for a future time period based on a previous workload history of said resources, and each queue of the one or more queues in the computing environment include a portion of total resources within the computing environment;

program instructions to select a best queue of the one or more queues to process the data integration job based on the predicted queue occupation, wherein the best queue is the one or more queues within the computing environment available, based on the predicted queue occupation, to be assigned to one or more containers that include at least the determined set of resources required to process the data integration job without a preemption event occurring;

program instructions to process the data integration job using the selected best queue;

program instructions to determine whether the preemption event causing removal of resources from the best queue processing the data integration job has occurred, wherein removal of the resources preempts processing of the data integration job; and responsive to determining that the preemption event did occur, program instructions to create a checkpoint, wherein;

the checkpoint indicates a last successful operation completed while processing the data integration job, and the checkpoint provides a point where processing of the data integration job can resume when enough resources become available.

9. The computer program product of claim 8, further comprising program instructions stored on the one or more computer readable storage media, to:

responsive to creating the checkpoint, exit the processing of the data integration job;

determine for a first time whether resources are available to continue processing the data integration job, wherein the determination is made after a first period of time; and responsive to determining for the first time that resources are available to continue processing the data integration job, process the data integration job starting at the created checkpoint.

10. The computer program product of claim 9, further comprising program instructions stored on the one or more computer readable storage media, to:

responsive to determining for the first time that resources are not available to continue processing the data integration job, determine for a second time whether resources are available to continue processing the data integration job, wherein the determination is made after a second period of time.

11. The computer program product of claim 8, further comprising program instructions stored on the one or more computer readable storage media, to:

responsive to determining that the preemption event has not occurred, complete the processing of the data integration job, and report a result of the processing of the data integration job.

12. The computer program product of claim 8, wherein the computing environment includes a plurality of containers assigned to the one or more queues in the computing environment and each container in the plurality of containers is assigned and utilizes a portion of an overall processing capability of the computing environment and a portion of an overall memory capability of the computing environment.

13. The computer program product of claim 8, wherein the preemption event occurs when computing resources assigned to a first queue, in use by a second queue, are required by the first queue for other processing and are subsequently removed from the second queue preempting processing in the second queue.

14. The computer program product of claim 8, wherein the set of resources includes a time duration required to process the data integration job to completion.

15. A computer system, the computer system comprising:

one or more computer processors, one or more computer readable storage media, and program instructions stored on the one or more computer readable storage media for execution by at least one of the one or more computer processors, the program instructions comprising:

program instructions to determine a set of resources within a computing environment required to process a data integration job to completion;

program instructions to determine whether the set of resources are available to process the data integration job to completion;

responsive to determining that the set of resources are not available, program instructions to predict a queue occupation for each queue of one or more queues in the computing environment, wherein;

the queue occupation is a workload of resources within each queue of the one or more queues for a future time period based on a previous workload history of said resources, and each queue of the one or more queues in the computing environment include a portion of total resources within the computing environment;

program instructions to select a best queue of the one or more queues to process the data integration job based on the predicted queue occupation, wherein the best queue is the one or more queues within the computing environment available, based on the predicted queue occupation, to be assigned to one or more containers that include at least the determined set of resources required to process the data integration job without a preemption event occurring;

program instructions to process the data integration job using the selected best queue;

program instructions to determine whether the preemption event causing removal of resources from the best queue processing the data integration job has occurred, wherein removal of the resources preempts processing of the data integration job; and responsive to determining that the preemption event did occur, program instructions to create a checkpoint, wherein;

the checkpoint indicates a last successful operation completed while processing the data integration job, and the checkpoint provides a point where processing of the data integration job can resume when enough resources become available.

16. The computer system of claim 15, further comprising program instructions stored on the one or more computer readable storage media for execution by at least one of the one or more computer processors, to:
  responsive to creating the checkpoint, exit the processing of the data integration job;
  determine for a first time whether resources are available to continue processing the data integration job, wherein the determination is made after a first period of time; and
  responsive to determining for the first time that resources are available to continue processing the data integration job, process the data integration job starting at the created checkpoint.

17. The computer system of claim 16, further comprising program instructions stored on the one or more computer readable storage media for execution by at least one of the one or more computer processors, to:
  responsive to determining for the first time that resources are not available to continue processing the data integration job, determine for a second time whether resources are available to continue processing the data integration job, wherein the determination is made after a second period of time.

18. The computer system of claim 15, further comprising program instructions stored on the one or more computer readable storage media for execution by at least one of the one or more computer processors, to:
  responsive to determining that the preemption event has not occurred, complete the processing of the data integration job, and
  report a result of the processing of the data integration job.

19. The computer system of claim 15, wherein the computing environment includes a plurality of containers assigned to the one or more queues in the computing environment and each container in the plurality of containers is assigned and utilizes a portion of an overall processing capability of the computing environment and a portion of an overall memory capability of the computing environment.

20. The computer system of claim 15, wherein the preemption event occurs when computing resources assigned to a first queue, in use by a second queue, are required by the first queue for other processing and are subsequently removed from the second queue preempting processing in the second queue.

* * * * *